United States Patent [19]
Rehkopf et al.

[11] 3,819,138
[45] June 25, 1974

[54] CHOCK CRADLE
[75] Inventors: John W. Rehkopf, Maumee, Ohio; Werner W. Barteck, La Salle, Mich.
[73] Assignee: Rehkopf Industries, Inc., Toledo, Ohio
[22] Filed: July 17, 1972
[21] Appl. No.: 272,184

[52] U.S. Cl............................ 248/146, 188/32
[51] Int. Cl............................ B65d 61/00
[58] Field of Search............ 248/146, 119 R; 188/32; 105/368 R; 211/23, 24; 52/102; 108/64; 48/146

[56] References Cited
UNITED STATES PATENTS

| | | | |
|---|---|---|---|
| 785,072 | 3/1905 | Rickords | 52/102 |
| 914,262 | 3/1909 | Friberg | 248/119 R |
| 1,228,438 | 6/1917 | Horan et al | 188/32 |
| 1,610,112 | 12/1926 | Wendle et al | 188/32 |
| 1,786,774 | 12/1930 | Parsons | 188/32 |
| 1,822,569 | 9/1931 | Einson | 211/24 |
| 2,304,305 | 12/1942 | Fulton | 188/32 |
| 2,521,539 | 9/1950 | Richardson | 188/32 |
| 3,265,159 | 8/1966 | Worden | 188/32 |
| 3,595,179 | 7/1971 | Taylor | 108/64 |

*Primary Examiner*—Edward C. Allen

[57] ABSTRACT

A hollow vacuum formed linear polyethylene or molded glass fiber reinforced plastic pair of interlocking chocks which form a portable cradle for a circumferentially ribbed tank. The top of each wedge shaped chock may be longitudinally arcuately grooved to support and seat the rib on the tank. The side walls of each chock have vertical notches for increasing their strength, and base of each chock is outwardly flanged for anchoring it in position on a horizontal supporting surface. The section of this flange at the lower end of each chock may have a ridge for interlocking it with an adjacent chock to form the tank cradle.

7 Claims, 8 Drawing Figures

CHOCK CRADLE

BACKGROUND OF THE INVENTION

Previously the metal or wood wedge shaped chocks employed to support large glass fiber reinforced plastic tanks on flat bed trailers or other vehicles, often punched holes in these tanks. In order to overcome this difficulty cradles for such tanks have been molded integrally with the tank as shown in the prior art. However with such permanently installed cradles on these type of tanks, a crane was required for the loading and unloading of these tanks.

SUMMARY OF THE INVENTION

Generally speaking, applicants have invented a simple and light weight hollow vacuum formed linear polyethylene or molded reinforced plastic chock which is so formed that it may be used in pairs to form a cradle for supporting the circumferentical reinforcing ribs of the tanks, without contacting the cylindrical surfaces of the tanks. More specifically, each chock has an open rectangular bottom surrounded by an outwardly extended peripheral flange or base through which nails or screws may be inserted for locking it in place on the flat bed of a vehicle or other supporting surface. Extending upwardly and inwardly from this flange are tapered side and end walls, with one end wall being higher than the other. All of the top edges of these side and end walls are integrally connected and spanned by a longitudinally arcuately grooved top. The two side walls and the higher end wall may be provided with vertical grooves intermediate their ends for further reinforcing and strengthening the chocks for the load placed on them.

The portion of the base flange at the lower end of each chock may be provided with an upstanding hollow ridge or projecting portion for interlock with a similar hollow ridge portion of the adjacent chock so that the small ends of a pair of chocks can form a cradle for supporting the circumferential ridge of a glass fiber reinforced plastic tank.

Thus when such a glass fiber reinforced plastic tank having two spaced circumferential reinforcing ribs is to be loaded onto a flat bed of a vehicle or trailer, two of these chocks may be nailed in placed onto the flat bed aligned with these two spaced ribs. Then by means of a rope or strap under and over the top of the tank, the strap may be pulled by one man to roll the tank up planks onto the flat bed and onto these chocks so that two other chocks may be interlocked with the ridges on the flanges of the already nailed down chocks. When these other two chocks are thus engaged to form cradles with the first two chocks, the strap around the tank is released and the tank is then cradled by its reinforcing ribs in the arcuate grooves of these chocks. When the tank is to be unloaded, the strap around the tank is pulled to rock the tank up on the first two nailed down chocks so the second two chocks can be removed, and then the tank may be released and rolled down off of the flat bed onto the ground. Such glass fiber tanks are commonly used for burying in the ground for the storing of gasoline at gas stations.

Accordingly it is an object of this invention to produce a simple, efficient, effective, and economical chock which is portable, strong and light in weight and will not damage the cylindrical surfaces of the large plastic tanks.

Another object is to produce such a chock which may be interlocked with a similar chock to form a cradle for such tanks.

BRIEF DESCRIPTION OF THE VIEWS

The above mentioned and other features, objects, and advantages and a manner of obtaining them are described more specifically below by references to an embodiment of this invention shown in the accompanying drawings, wherein.

DETAILED DESCRIPTION OF A PREFERRED EMBODIMENT

Figure 1:
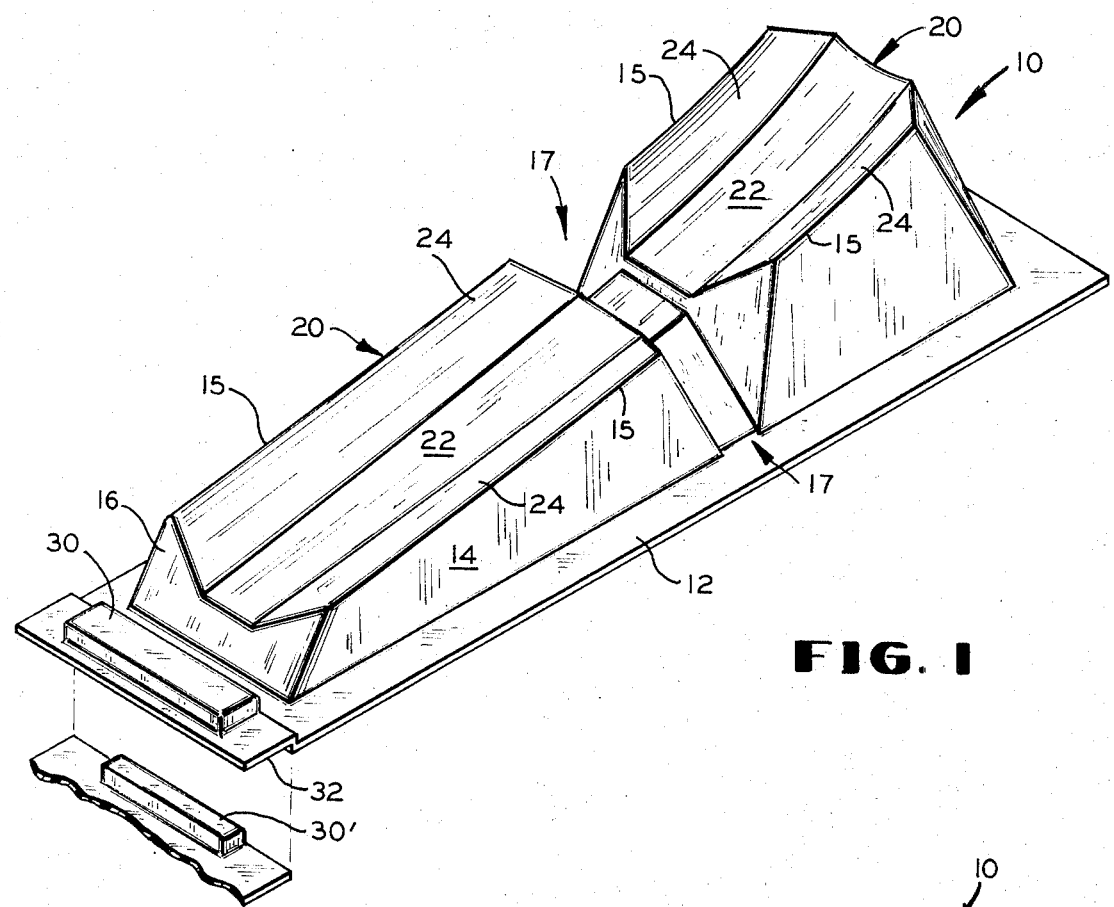
FIG. 1 is a perspective view of a full one and the interlocking end of the other of a pair of chocks according to a preferred embodiment of this invention showing their general configuration.

Referring to the drawings, each chock of the pair comprises a hollow vacuum formed linear polyethylene or molded glass fiber reinforced plastic wedged shaped member 10 having a substantially rectangular outwardly extending rim or flange base 12 from the inner rectangular peripheral edge of which upwardly and inwardly slopes the hollow wedged shape member having opposite similar sides or walls 14, a lower end wall 16, and a higher opposite end wall 18. The top edges of all of these four walls, 14, 16 and 18 are integrally joined in a top wall or portion 20 having a longitudinally arcuate surface and central longitudinal arcuate groove, so that the top wall 20 cross-section has a central flat groove portion 22 and two parallel arcuate flanged or edged portions 24 which join the two side walls 14 along edges 15.

The two side walls 14 and the higher end wall 18 may be each provided with vertical grooved portions 17 and 19, respectfully intermediate of their ends. The sides of these grooves 17 and 19 add supportive strength to the top wall 20 so that each of the chocks 10 can support more weight for a given thickness of their walls. If desired, additional vertical grooves may be formed in the side walls of each chock 10 to increase its supporting strength without departing from the scope of this invention.

Figure 6:
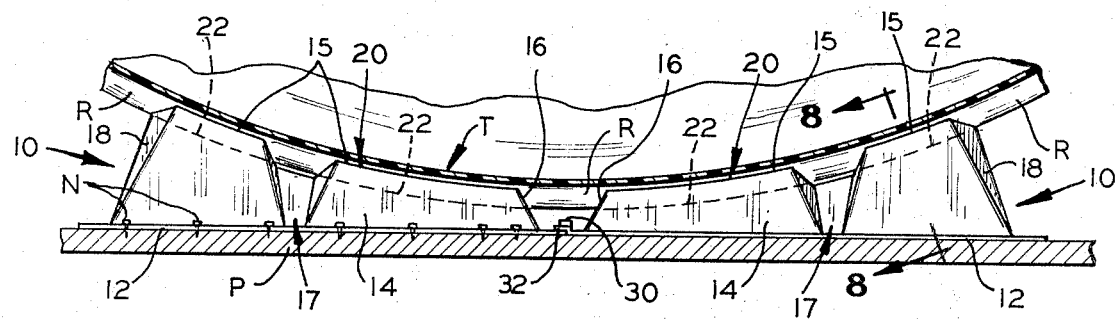
FIG. 6 is a side elevational view of a pair of chocks as shown in FIGS. 1 and 2 interlocked together to form a cradle and attached to the flat bed of a trailer, part of which is shown in section, and on which cradle a part of the circumferential rib of a glass fiber reinforced plastic tank is supported with parts of the tank broken away, and shown in section.
Figure 7:
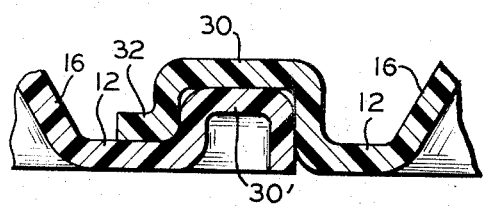
FIG. 7 is an enlarged sectional view of the interlocking portions between the two cooperating chocks shown in FIG. 6 at the center of the cradle.
Figure 8:
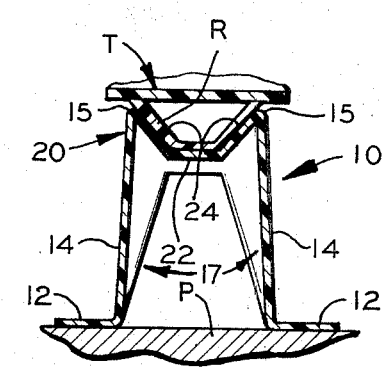
FIG. 8 is a vertical sectional view taken along line 8 — 8 of FIG. 6 showing how the reinforcing rib of the tank fits into and is supported by the top groove of a chock.

When a pair of chocks 10 are employed as a cradle for a tank T as shown in FIG. 6, which tank T has one or more circumferentially outwardly extending ribs R (see also FIG. 8), the end sections of the base flanges 12 of each chock 10 may be provided with an inwardly upwardly projecting hollow rib or ridge portion 30 or 30'(see also FIG. 7). The larger rib portion 30 may also be offset 32 as shown in FIGS. 1 and 7, so that when the two chocks 10 are put together as shown in FIG. 6, the smaller ridge portion 30' may nest into the larger hollow ridge portion 30 to lock two chocks 10 together and prevent them from spreading apart when the weight of the tank T is placed thereon.

Figure 2:
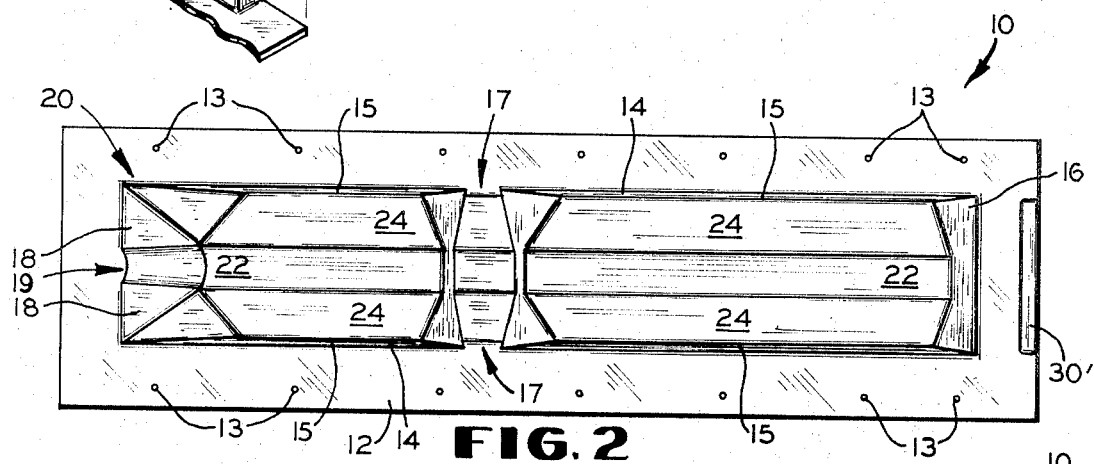
FIG. 2 is a top view of the other or complimentary chock only partially shown in FIG. 1.
Figure 3:
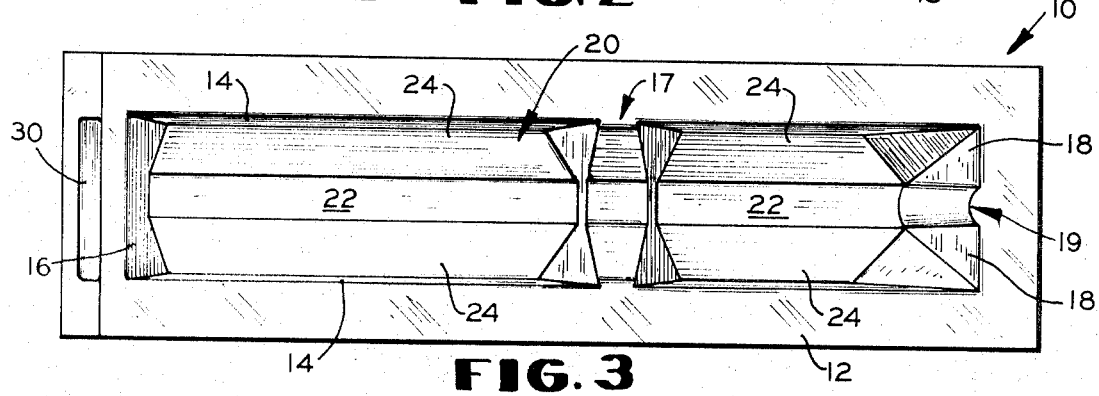
FIG. 3 is a bottom view looking into the hollow portion of the chock shown in FIG. 1.
Figure 4:
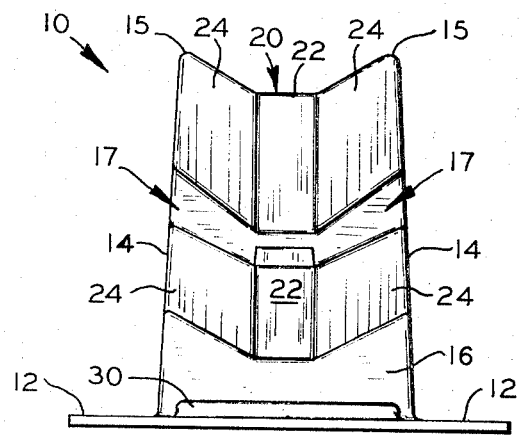
FIG. 4 is a view from the left hand or lower end of the wedge shaped chock of FIG. 1.
Figure 5:
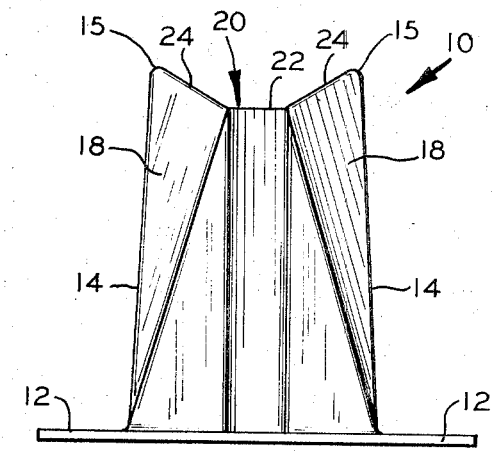
FIG. 5 is a view from the right hand or higher end of the chock shown in FIG. 1.

Furthermore, the base flange 12 of each chock 10 may be provided with holes 13 (see FIG. 2), if desired, through which screws or nails N may be pounded into a platform or a deck P (see FIG. 6) of a flat top trailer to anchor the chocks in position. Thus, if desired, the chocks 10 of this invention may be provided without the interlocking rib or ridge portions 30 and 30' on their flanges 12 adjacent the lower end of each chock, and just be nailed in place.

The curvature of the arcuate surface of the top 20 and its groove 22 are correspondingly made to substantially fit the arcuate curvature of the tank T and its rib R, respectfully, so that the support of the tank is on the bottom of the groove 22 by the rib R and the side edges 24 and 15 of the groove 22 merely prevents axially sliding of the tank T in the chocks and do not contact the outer surface of the tank T to puncture or cause damage to the tank per se. However the chocks 10 of this invention may have different radii for their tops depending upon the diameter of the cylindrical tanks and their ribs which they are to support.

Although there is described above the principles of this invention in connection with specific apparatus, it is to be clearly understood that this description is made only by way of example and not as a limitation of the scope of this invention.

We claim:

1. A hollow chock comprising:
   A. a rectangular base having a peripheral horizontal flange,
   B. side and end walls extending inwardly and upwardly from the inner peripheral edge of said flange,
   C. a top wall connecting the top edges of said side and end walls and having a longitudinally concave arcuate surface with a central longitudinal groove therein, and
   D. at least one vertical reinforcing groove in each side wall intermediate its side edges, said vertical grooves extending inwardly to substantially the bottom edges of said central longitudinal groove to aid in the support of said central longitudinal groove.

2. A chock according to claim 1 composed of a vacuum formed linear polyethylene plastic material.

3. A chock according to claim 1 composed of a molded glass fiber reinforced plastic material.

4. A chock according to claim 1 wherein said two side walls are substantially the same and one end wall is higher than the other end wall.

5. A chock according to claim 4 wherein the section of flange adjacent the shorter end wall has a ridge portion intermediate at its ends and edges for locking engagement with a similar ridge portion on other chock whereby the two interlocking chocks form a cradle.

6. A pair of hollow chocks forming a cradle, each chock comprising:
   A. a rectangular base having a peripheral horizontal flange,
   B. side and end walls extending inwardly and upwardly from the inner peripheral edge of said flange,
   C. a top wall connecting the top edges of said side and end walls and having a longitudinally concave arcuate surface with a central longitudinal groove therein, and
   D. at least one vertical reinforcing groove in each side wall intermediate its side edges, said vertical grooves extending inwardly to substantially the bottom edges of said central longitudinal groove to aid in the support of said central longitudinal groove.

7. A pair of hollow chocks according to claim 6 wherein one end wall of each chock is lower than its other end wall, and each chock has a ridge in that portion of said base flange adjacent its lower end wall for interlocking engagement with a similar ridge on the other of said pair of chocks.

* * * * *